(12) United States Patent
Shen et al.

(10) Patent No.: US 11,200,682 B2
(45) Date of Patent: Dec. 14, 2021

(54) TARGET RECOGNITION METHOD AND APPARATUS, STORAGE MEDIUM, AND ELECTRONIC DEVICE

(71) Applicant: BEIJING SENSETIME TECHNOLOGY DEVELOPMENT CO., LTD., Beijing (CN)

(72) Inventors: Yantao Shen, Beijing (CN); Tong Xiao, Beijing (CN); Hongsheng Li, Beijing (CN); Shuai Yi, Beijing (CN); Xiaogang Wang, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 185 days.

(21) Appl. No.: 16/565,069

(22) Filed: Sep. 9, 2019

(65) Prior Publication Data
US 2020/0005090 A1 Jan. 2, 2020

Related U.S. Application Data

(63) Continuation of application No. PCT/CN2018/097374, filed on Jul. 27, 2018.

(30) Foreign Application Priority Data

Jul. 28, 2017 (CN) .......................... 201710633604.3

(51) Int. Cl.
*G06T 7/246* (2017.01)
*G06K 9/62* (2006.01)
*G06N 3/08* (2006.01)

(52) U.S. Cl.
CPC ............ *G06T 7/246* (2017.01); *G06K 9/6226* (2013.01); *G06K 9/6262* (2013.01); *G06K 9/6297* (2013.01); *G06N 3/08* (2013.01)

(58) Field of Classification Search
CPC . G06T 7/20–292; G06T 7/246; G06K 9/6226; G06K 9/6262; G06K 9/6297; G06N 3/08
See application file for complete search history.

(56) References Cited

U.S. PATENT DOCUMENTS

2005/0093697 A1* 5/2005 Nichani .................. G06T 7/593
340/545.1
2015/0154457 A1 6/2015 Datta et al.
2019/0026568 A1* 1/2019 Kario ................. G06K 9/00798

FOREIGN PATENT DOCUMENTS

CN 105095362 A 11/2015
CN 106326837 A 1/2017
(Continued)

OTHER PUBLICATIONS

English translation of the Written Opinion of the International Search Authority in the international application No. PCT/CN2018/097374, dated Nov. 5, 2018.
(Continued)

*Primary Examiner* — Casey L Kretzer
(74) *Attorney, Agent, or Firm* — Syncoda LLC; Feng Ma

(57) ABSTRACT

A method for identifying a target, a non-transitory computer-readable storage medium, and an electronic device include: acquiring a first image and a second image, the first image and the second image each including a target to be determined; generating a prediction path based on the first image and the second image, both ends of the prediction path respectively corresponding to the first image and the second image; and performing validity determination on the prediction path and determining, according to a determination result, whether the targets to be determined in the first image and the second image are the same target to be determined.

20 Claims, 7 Drawing Sheets

(56) References Cited

FOREIGN PATENT DOCUMENTS

| | | |
|---|---|---|
| CN | 106650660 A | 5/2017 |
| CN | 106778517 A | 5/2017 |
| CN | 108229292 A | 6/2018 |
| JP | 2001208844 A | 8/2001 |
| JP | 2005190142 A | 7/2005 |
| JP | 2016207117 A | 12/2016 |
| JP | 2017083273 A | 5/2017 |
| JP | 2017084079 A | 5/2017 |
| JP | 2018506788 A | 3/2018 |
| WO | 2014024264 A1 | 2/2014 |

OTHER PUBLICATIONS

First Office Action of the Japanese application No. 2019-557616, dated Jan. 5, 2021.

International Search Report in the international application No. PCT/CN2018/097374, dated Nov. 5, 2018.

Computer Vision and Image Understanding; "Modeling inter-camera space-time and appearance relationships for tracking across non-overlapping views", Omar Javed, Khurram Shafique, Zeeshan Rasheed, Mubarak Shah; published on Feb. 27, 2017, p. 146-162.

In European Conference on Computer Vision; "Person Re-Identification via Recurrent Feature Aggregation", Yichao Yan, Bingbing Ni, Zhichao Song, Chao Ma, Yan Yan, Xiaokan; published on Oct. 16, 2016, p. 701-716.

In European Conference on Computer Vision; "A Deep Learning-Based Approach to Progressive Vehicle Re-identification for Urban Surveillance", Xinchen Liu, Wu Liu, Tao Mei, Huadong Ma; published on Oct. 16, 2016, p. 869-884.

"Learning Deep Neural Networks for Vehicle Re-ID with Visual-spatio-temporal Path Proposals", Yantao Shen, Tong Xiao, Hongsheng Li, Shuai Yi, Xiaogang Wang.

\* cited by examiner

TARGET RECOGNITION METHOD AND APPARATUS, STORAGE MEDIUM, AND ELECTRONIC DEVICE

CROSS-REFERENCE TO RELATED APPLICATION

This is a continuation of International Patent Application No. PCT/CN2018/097374 filed on Jul. 27, 2018, which claims priority to Chinese Patent Application No. 201710633604.3 filed on Jul. 28, 2017. The disclosures of these applications are incorporated herein by reference in their entirety.

BACKGROUND

Vehicle re-identification, such as car re-identification, is important content in the field of computer vision and public safety, and has great potential applications in many aspects such as vehicle detection and tracking, travel route estimation, and abnormal behavior detection.

Most vehicle re-identification technologies determine based on appearance information of vehicles. Unlike pedestrian re-identification, the difficulty in performing vehicle re-identification by simply using the appearance information of vehicles is: many vehicles have the similar appearances (such as color, model, shape, etc.). Especially, the differences will be even less in different vehicles of the same brand and the same style. For detection and identification depending on identification information of vehicles such as license plate information of cars, decorations in vehicles such as decorations in cars, and other unique details, the robustness of detection and identification may become weaker due to poor viewing angles of surveillance cameras, poor lighting conditions, blurred lenses, and other factors, resulting in inaccurate detection and identification results.

SUMMARY

Embodiments of the present disclosure relate to the technical field of artificial intelligence, and in particular to a method and an apparatus for identifying a target, a non-transitory storage medium, and an electronic device, and provide technical solutions for target identification.

According to a first aspect of the embodiments of the present disclosure, a method for identifying a target is provided. The method includes: acquiring a first image and a second image, the first image and the second image each including a target to be determined; generating a prediction path based on the first image and the second image, both ends of the prediction path respectively corresponding to the first image and the second image; and performing validity determination on the prediction path and determining, according to a determination result, whether the targets to be determined in the first image and the second image are the same target to be determined.

According to a second aspect of the embodiments of the present disclosure, an apparatus for identifying a target is provided. The apparatus includes: an acquisition module configured to acquire a first image and a second image, the first image and the second image each including a target to be determined; a generation module configured to generate a prediction path based on the first image and the second image, both ends of the prediction path respectively corresponding to the first image and the second image; and a first determination module configured to perform validity determination on the prediction path and determine, according to a determination result, whether the targets to be determined in the first image and the second image are the same target to be determined.

According to a third aspect of the embodiments of the present disclosure, a non-transitory computer-readable storage medium is provided, and has computer program instructions stored thereon, where when the program instructions are executed by a processor, steps of the method for identifying a target according to the first aspect of the embodiments of the present disclosure are implemented.

According to a fourth aspect of the embodiments of the present disclosure, an electronic device is provided, and includes: a processor, a memory, a communication element, and a communication bus, where the processor, the memory, and the communication element communicate with one another by means of the communication bus; and the memory is configured to store at least one executable instruction, and the executable instruction causes the processor to execute steps of the method for identifying a target according to the first aspect of the embodiments of the present disclosure.

According to the technical solutions provided by the embodiments of the present disclosure, a prediction path through which the targets to be determined may pass is generated based on information contained in the first image and the second image; and whether the targets to be determined in the first image and the second image are the same is determined by performing validity determination on the prediction path. The validity determination is determination of a possibility whether the current prediction path will be the travel route of the same target to be determined. The higher the possibility is, the higher the possibility of the targets to be determined in the first image and the second image being the same target to be determined is. Thus, whether targets to be determined in different images are the same target to be determined can be detected and identified more accurately.

DETAILED DESCRIPTION

Figure 1:
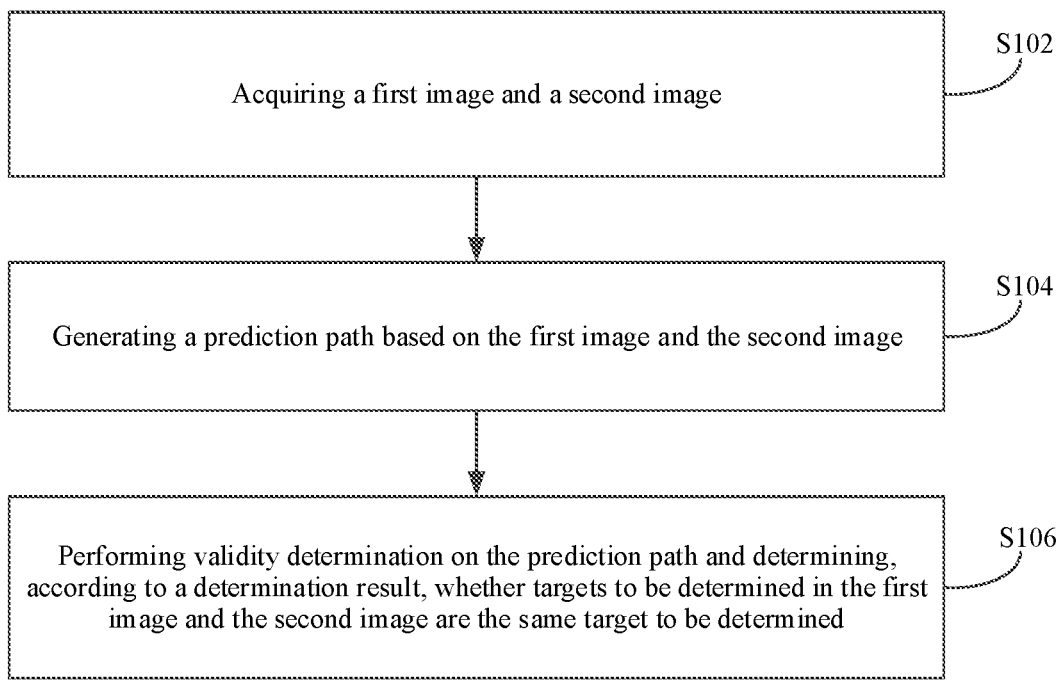
FIG. 1 is a schematic flowchart of a method for identifying a target according to Embodiment I of the present disclosure.

The specific implementations of the embodiments of the present disclosure are further described in detail below with reference to the accompanying drawings (the same reference numerals in several accompanying drawings represent the same elements) and the embodiments. The following embodiments are intended to illustrate the present disclosure, but are not intended to limit the scope of the present disclosure.

Persons skilled in the art can understand that the terms "first", "second" and the like in the embodiments of the present disclosure are only used to distinguish different steps, devices or modules, etc., and do not represent any specific technical meaning or inevitable logical sequence therebetween.

Embodiment I

FIG. 1 is a schematic flowchart of a method for identifying a target according to Embodiment I of the present disclosure. As shown in FIG. 1, the method for identifying a target in this embodiment includes the following steps:

In step S102, a first image and a second image are acquired.

In a specific implementation, from the content contained in the images, the first image and the second image each include a target to be determined. From the types of the images, the first image and the second image may both be static images captured, or video images in a video frame sequence, and the like. Specifically, the targets to be determined include a pedestrian, an unmanned aerial vehicle, a vehicle, and the like. It should be understood that this embodiment is not limited thereto, and any movable object is contained in the range of the targets to be determined.

In step S104, a prediction path is generated based on the first image and the second image.

Both ends of the prediction path respectively correspond to the first image and the second image. In the embodiments of the present disclosure, travel routes of the targets to be determined may be predicted based on feature information of the targets to be determined contained in the first image and the second image and spatiotemporal information contained in the first image and the second image, and the reliability of identification of the targets to be determined is enhanced by means of the route prediction results. Specifically, based on the information contained in the first image and the second image, it is necessary to further find possible travel routes of the targets to be determined in the images, where images of the targets to be determined captured on the travel routes should be spatiotemporally related to the first image and the second image.

In step S106, validity determination is performed on the prediction path, and whether the targets to be determined in the first image and the second image are the same target to be determined is determined according to a determination result.

The validity determination is determination of a possibility whether a prediction path will be the travel route of the same target to be determined. The higher the possibility is, the higher the possibility of the targets to be determined in the first image and the second image being the same target to be determined is, that is, the higher the possibility of the target to be determined in the first image being the same as the target to be determined in the second image is. In a specific implementation, the result of the validity determination may specifically be a validity probability, or may directly be "valid or not."

According to the method for identifying a target provided by this embodiment, a prediction path through which the targets to be determined may pass is generated based on information contained in the first image and the second image; and whether the targets to be determined in the first image and the second image are the same is determined by performing validity determination on the prediction path. The validity determination is determination of a possibility whether the current prediction path will be the travel route of the same target to be determined. The higher the possibility is, the higher the possibility of the targets to be determined in the first image and the second image being the same target to be determined is. Thus, whether targets to be determined in different images are the same target to be determined can be detected and identified more accurately.

The method for identifying a target in this embodiment is performed by any appropriate device having image or data processing capabilities, including but not limited to: a camera, a terminal, a mobile terminal, a Personal Computer (PC), a server, an in-vehicle device, an entertainment device, an advertising device, a Personal Digital Assistant (PDA), a tablet computer, a laptop computer, a handheld game console, smart glasses, a smart watch, a wearable device, a virtual display device, or a display enhancement device (such as Google Glass, Oculus Rift, Hololens, Gear VR), and the like.

Embodiment II

Figure 2:
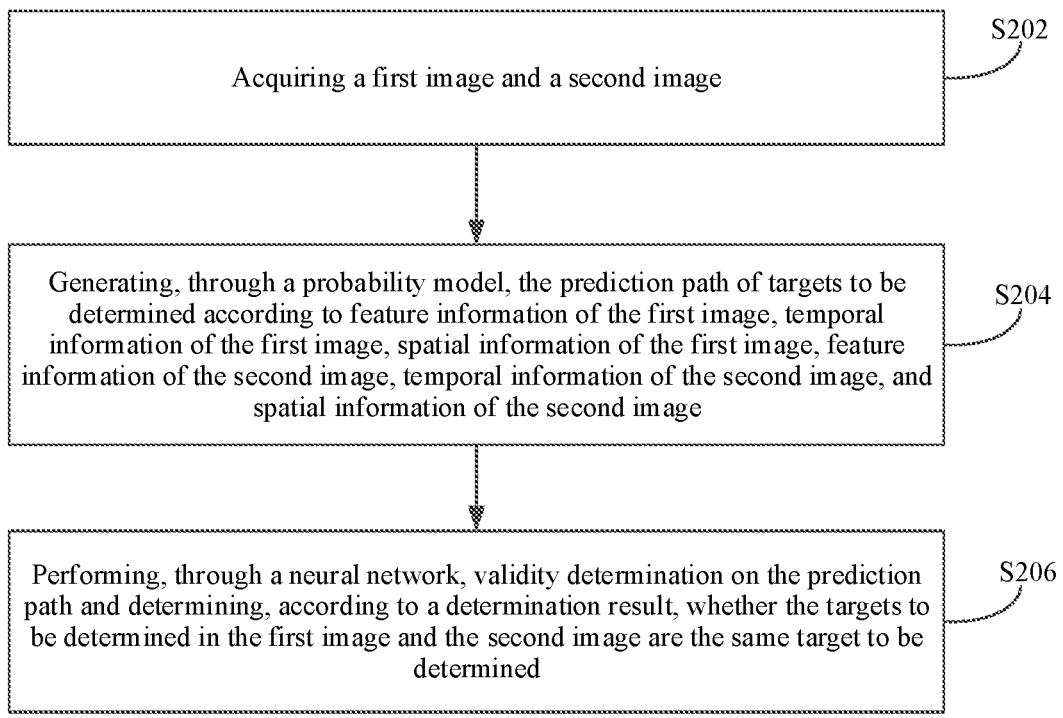
FIG. 2 is a schematic flowchart of a method for identifying a target according to Embodiment II of the present disclosure.

Referring to FIG. 2, a schematic flowchart of a method for identifying a target according to Embodiment II of the present disclosure is shown.

In this embodiment, the method for identifying a target in the embodiments of the present disclosure is described by taking a vehicle being a target to be determined as an example. However, persons skilled in the art should understand that in practical application, corresponding target identification operations can be implemented for other targets to be determined with reference to this embodiment.

The method for identifying a target in this embodiment includes the following steps:

In step S202, a first image and a second image are acquired.

In a specific implementation, the first image and the second image each include a target to be determined, and the target to be determined is a vehicle.

In step S204, the prediction path of the targets to be determined is generated by means of a probability model according to the feature information of the first image, the temporal information of the first image, the spatial information of the first image, the feature information of the second image, the temporal information of the second image, and the spatial information of the second image.

Compared with a pedestrian's travel route, the travel routes of vehicles are more stable and more regular, and the accuracy of determination and identification is higher. Therefore, the travel routes of the vehicles may be predicted by using the feature information of the vehicles (which can characterize the appearances of the vehicles) together with the spatiotemporal information in the images, and the reliability of vehicle identification can be enhanced by means of the route prediction results.

The temporal information of the image is configured to indicate the time at which the image is captured, and said time may be regarded as the time at which the target to be determined (such as a vehicle) passes the photographing device. The spatial information of the image is configured to indicate the position where the image is captured, and said position may be regarded as the position where the photographing device is located, or may also be regarded as the position where the target to be determined such as the vehicle is located when being photographed. The feature information of the image is configured to indicate features of the target to be determined in the image, such as features of the vehicle; according to the features, the appearance and other information of the vehicle can be determined. It can be understood that information contained in the images involved in this embodiment includes, but is not limited to, temporal information of the images, spatial information of the images, and feature information of the images.

In a specific implementation, the probability model is an MRF.

A random field may be regarded as a set of random variables corresponding to the same sample space. In general, if there are dependencies between the random variables, the random field is considered to have practical significance. The random field includes two elements, i.e., site and phase space. When a value of the phase space is randomly assigned to each site according to a certain distribution, the whole is called a random field.

An MRF is a random field having a Markov property. The Markov property refers to that when a random variable sequence is sequentially arranged in time order, the distribution characteristics at an $(N+1)^{th}$ moment are independent of the values of random variables before the $N^{th}$ moment. One MRF corresponds to one undirected graph. Each node on the undirected graph corresponds to a random variable, and an edge between nodes indicates a probability dependency between random variables corresponding to the nodes. Therefore, the structure of MRF essentially reflects a priori knowledge, that is, which variables have dependencies therebetween that need to be considered and which can be ignored.

In this embodiment, at least one prediction path of the targets to be determined in the first image and the second image may be generated by means of an MRF, and then an optimal path is determined from the at least one prediction path as the prediction path of the targets to be determined. Specifically, the prediction path of the targets to be determined may be generated by means of the MRF according to the feature information of the first image, the temporal information of the first image, the spatial information of the first image, the feature information of the second image, the temporal information of the second image, and the spatial information of the second image. In one embodiment, all images including information of the targets to be determined and having a spatiotemporal sequence relationship with the first image and the second image may be determined from an acquired image set by means of a chain MRF; and the prediction path of the targets to be determined is generated according to temporal information and spatial information corresponding to all the determined images.

Spatiotemporal data refers to data that has both temporal and spatial dimensions, including information in temporal and spatial dimensions. In geography, since continuous spatiotemporal data is extracted by means of discretization sampling and then stored, spatiotemporal data may be regarded as a temporal sequence set with spatial correlations, i.e., a spatiotemporal sequence. Data in the set may be considered as data with spatiotemporal sequence relationships. Specifically, all images having a spatiotemporal sequence relationship with the first image and the second image means that spatiotemporal data contained in all the images is temporally and spatially correlated with the spatiotemporal data contained in the first image and spatiotemporal data contained in the second image, separately.

Generally, by using the first image as a path head node image and using the second image as a path tail node image, a prediction path with the first image as a head node and the second image as a tail node may be generated according to the temporal information and the spatial information corresponding to all the images determined by means of the chain MRF, where the prediction path further corresponds to at least one intermediate node in addition to the head node and the tail node.

When determining, from an acquired image set by means of a chain MRF, all images including information of the targets to be determined and having a spatiotemporal sequence relationship with the first image and the second image, position information of all camera devices from a start position to an end position may be acquired by using a position corresponding to the spatial information of the first image as the start position and using a position corresponding to the spatial information of the second image as the end position; at least one device path may be generated according to the relationships between positions indicated by the position information of all the camera devices by using a camera device corresponding to the start position as a start point and using a camera device corresponding to the end position as an end point, where each device path further includes information of at least one other camera device in addition to the camera device as the start point and the camera device as the end point; and an image may be determined, from images captured by each of the other camera devices on the current path, for each device path by using time corresponding to the temporal information of the first image as start time and using time corresponding to the temporal information of the second image as end time, where the image includes the information of the targets to be determined, and has a set temporal sequence relationship with an image which includes the information of the targets to be determined and is captured by a previous camera device adjacent to the current camera device.

Then, when generating a prediction path with the first image as a head node and the second image as a tail node according to the temporal information and the spatial information corresponding to all the determined images, a plurality of connected intermediate nodes having a spatiotemporal sequence relationship may be generated for each device path according to the temporal sequence relationship of the determined images; an image path having a spatiotemporal sequence relationship and corresponding to the current device path may be generated according to the head node, the tail node, and the intermediate nodes; and a maximum probability image path with the first image as the head node and the second image as the tail node may be determined from the image path corresponding to each device path as the prediction path of the targets to be determined.

When determining, from the image path corresponding to each device path, a maximum probability image path with the first image as the head node and the second image as the tail node as the prediction path of the targets to be determined, for the image path corresponding to each device path, a probability of images of every two adjacent nodes in the image path having information of the same target to be determined may be acquired; a probability of the image path being a prediction path of the target to be determined may be calculated according to the probability of the images of every two adjacent nodes in the image path having the information of the same target to be determined; and the maximum probability image path may be determined as the prediction path of the target to be determined according to the probability of each image path being a prediction path of the target to be determined.

By taking a vehicle being the target to be determined in this embodiment as an example, it is assumed that the travel route of the vehicle in a road network is a chain MRF and each node on the chain is a camera, the variable space of the node is a triple composed of images captured by the camera, and the photographing times and locations of the images. Giving any pair of images requiring identification about whether the images involve the same vehicle, and possible surveillance cameras therebetween are given (the possible surveillance cameras are a priori information, and can be obtained by any appropriate way, such as by collecting statistics on a data training set). Each pair of images of adjacent cameras and spatiotemporal differences between the pair of images are input into a Siamese-CNN to calculate the probability of vehicles in each pair of images captured by adjacent surveillance cameras in the road network being the same vehicle. The Siamese-CNN may be regarded as a potential energy function between adjacent nodes in the MRF. The product value of the potential energy function may be minimized (optimized) by means of a Maximum Subsequence Sum (Max-Sum) algorithm to obtain a prediction path of the highest possibility. The prediction path includes the geographic location of a camera through which the vehicle passes, the time at which the vehicle is photographed, and related information of the captured image.

For example, by setting p to represent information of the first image (including feature information, temporal information, and spatial information) and q to represent information of the second image (including feature information, temporal information, and spatial information), one way to determine the optimal path from a plurality of possible prediction paths by means of the chain MRF can be achieved by maximizing the following formula (1):

$$P(X \mid x_1 = p, x_N = q) = \frac{1}{z}\varphi(p, x_2), \varphi(x_{N-1}, q) \prod_{i=2}^{N-2} \varphi(x_i, x_{i+1}) \quad (1)$$

where P represents a prediction path (i.e., prediction path through which a vehicle may pass), X represents cameras, N represents the number of cameras on a prediction path, from X1 to XN, $x_1$ represents information of an image of the vehicle captured by X1, and so forth, represents information of an image of the vehicle captured by XN, φ0 represents potential energy function (i.e., output of the Siamese-CNN, which is a probability value between 0 and 1), $\varphi(x_i, x_{i+1})$ represents potential energy function pair between $x_i$ and $x_{i+1}$, and $x_i$ and $x_{i+1}$ are considered to include information of the same vehicle. If $x_i$ and $x_{i+1}$ do include information of the same vehicle, then for $\varphi(x_i, x_{i+1})$, there will be a larger value, otherwise there will be a lower value.

When maximizing the formula (1), the time constraint described in the formula (2) may be used to make the formula (2) satisfy the formula (3):

$$X^* = {}^{arg\ max}{}_X P(X \mid x_1 = p, x_N = q) \quad (2)$$

$$t_{i,k_i}^* \leq t_{i+1,k_{i+1}}^* \forall i \in (1, \ldots, N-1) \quad (3)$$

where t represents time, $k^*_i$ and $k^*_{i+1}$ respectively represent the optimal selection of information of an image corresponding to and the optimal selection of information of an image corresponding to $x_{i+1}$, X represents cameras, N represents the number of cameras on a prediction path, and from X1 to XN, $x_1$ represents information of an image of the vehicle captured by X1, and so forth, $x_N$ represents information of an image of the vehicle captured by XN.

In the formulas (1), (2), and (3), the information of an image includes temporal information, spatial information, and feature information of the image.

Based on the formulas (1), (2), and (3), the formula (1) may be optimized into the following formula (4) to obtain an optimal path, i.e., a maximum probability path through which the vehicle may pass.

$$\max_x P(X \mid x_1 = p, x_N = q) = \frac{1}{Z}\varphi(p, x_2), \quad (4)$$

$$\varphi(x_{N-1}, q) \max_{x_2} \ldots \max_{x_{N-1}} \prod_{i=2}^{N-1} \varphi(x_i, x_{i+1}) =$$

$$\frac{1}{Z} \max_{x_2} \left[ \varphi(p, x_2)\varphi(x_2, x_3) \left[ \ldots \max_{x_{N-1}} \varphi(x_{N-1}, x_q) \right] \ldots \right]$$

By means of the process above, a prediction path through which the vehicle is most likely to pass may be determined.

For example, by using the first image as a prediction path head node A and using the second image as a prediction path tail node D, according to the positional relationships between camera devices, possible driving routes of the vehicle include: route 1: A→B→C→D; route 2: A→E→D; and route 3: A→F→G→H→D. It is determined after the calculation based on the formula (4) that the probability of route 1 is 85%, the probability of route 2 is 95%, and the probability of route 3 is 70%. Then route 2 can be determined as the prediction path of the vehicle.

It should be noted that the process above is exemplified by a chain MRF. However, in practical applications, persons skilled in the art may also use other appropriate ways to generate the prediction path of the targets to be determined. For example, background information of the first image and the second image is detected based on a depth neural network to generate the prediction path of the targets to be determined.

In step S206, validity determination is performed on the prediction path by means of a neural network and whether the targets to be determined in the first image and the second image are the same target to be determined is determined according to a determination result.

The neural network is any appropriate neural network that can implement feature extraction or target object identification, including, but not limited to, a Convolutional Neural Network (CNN), a reinforcement learning neural network, a generative network in generative adversarial networks, and the like. The specific structure in the neural network may be appropriately configured by persons skilled in the art according to actual needs, such as the number of convolutional layers, the size of the convolution kernel, the number of channels, and the like, and are not limited in the embodiments of the present disclosure.

In a specific implementation, the neural network is an LSTM. LSTM is a time recurrent neural network which is a variant of a Recurrent Neural Network (RNN), and is good at processing sequence information. In the embodiments of the present disclosure, the prediction path of the vehicle may also be considered as sequence information, and can be processed by means of an LSTM to determine the validity of the prediction path.

The validity determination is determination of a possibility whether a prediction path will be the travel route of the same target to be determined. The higher the possibility is, the higher the possibility of the targets to be determined in the first image and the second image being the same target to be determined is.

In this embodiment, the temporal difference between adjacent images in the prediction path may be acquired according to temporal information of the adjacent images; the spatial difference between the adjacent images may be acquired according to spatial information of the adjacent images; the feature difference between the targets to be determined in the adjacent images may be acquired according to feature information of the targets to be determined in the adjacent images; the obtained temporal difference, spatial difference, and feature difference between the adjacent images in the prediction path may be input into an LSTM to obtain an identification probability of the targets to be determined in the prediction path; and whether the targets to be determined in the first image and the second image are the same target to be determined may be determined according to the identification probability of the targets to be determined in the prediction path. The specific determination criteria for whether the targets to be determined are the same target to be determined may be appropriately configured by persons skilled in the art according to actual needs, and are not limited in the embodiments of the present disclosure.

The temporal difference between the adjacent images may be obtained by performing subtraction on the temporal information of the two images, the spatial difference between the adjacent images may be obtained by calculating the distance between the locations where the two images are captured, and the feature difference between the adjacent images may be obtained by performing subtraction on feature vectors of the two images. In a feasible implementation, when obtaining the feature difference between adjacent images, a Siamese-CNN may be utilized, and feature information of the targets to be determined in the adjacent images is separately acquired by means of the Siamese-CNN; and the feature difference between the targets to be determined in the adjacent images is acquired according to the separately acquired feature information. The Siamese-CNN in this step may be the same as or different from the Siamese-CNN in step S204.

In this embodiment, after a travel route between any two vehicle images is obtained by means of the MRF, it is necessary to determine whether the travel route is valid, that is, to perform validity determination. Valid means that the travel route is a route that the same vehicle will travel, otherwise, the travel route is an invalid route. In this embodiment, the determination mode adopted is using an LSTM for determination. Inputs of the LSTM are the temporal difference (i.e., temporal difference), the distance difference (i.e., spatial difference), and the appearance difference (i.e., feature difference) between adjacent nodes on the route. As stated above, the appearance difference may be obtained by directly performing subtraction on feature vectors output after inputting two images to the Siamese-CNN. Output of the LSTM is a probability value by which the validity of the prediction path can be determined to determine whether the vehicles in the two images are the same vehicle.

In view of the above, by means of this embodiment, a prediction path through which the targets to be determined in the first image and a second image may pass is generated based on spatiotemporal information and feature information contained in the images; and whether the targets to be determined in the first image and the second image are the same is determined by performing validity determination on the prediction path. The validity determination is determination of a possibility whether the current prediction path will be the travel route of the same target to be determined. The higher the possibility is, the higher the possibility of the targets to be determined in the first image and the second image being the same target to be determined is. Thus, whether targets to be determined in different images are the same target to be determined can be detected and identified more accurately.

The method for identifying a target in this embodiment is performed by any appropriate device having image or data processing capabilities, including but not limited to: a camera, a terminal, a mobile terminal, a PC, a server, an in-vehicle device, an entertainment device, an advertising device, a PDA, a tablet computer, a laptop computer, a handheld game console, smart glasses, a smart watch, a wearable device, a virtual display device, or a display enhancement device (such as Google Glass, Oculus Rift, Hololens, Gear VR), and the like.

Embodiment III

Figure 3:
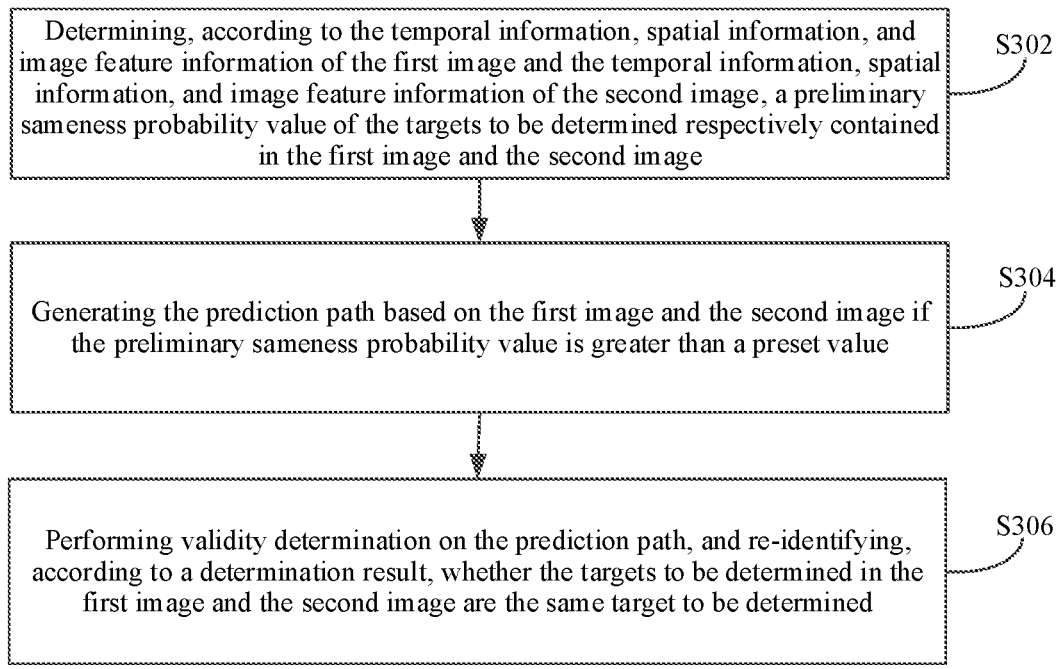
FIG. 3 is a schematic flowchart of a method for identifying a target according to Embodiment III of the present disclosure.

Referring to FIG. 3, a schematic flowchart of a method for identifying a target according to Embodiment III of the present disclosure is shown.

In this embodiment, the method for identifying a target in the embodiments of the present disclosure is described by taking a vehicle being a target to be determined as an example. However, persons skilled in the art should understand that in practical application, corresponding target identification operations can be implemented for other targets to be determined with reference to this embodiment.

The method for identifying a target in this embodiment includes the following steps:

In step S302, a preliminary sameness probability value of the targets to be determined respectively contained in the first image and the second image is determined according to temporal information, spatial information, and image feature information of the first image and temporal information, spatial information, and image feature information of the second image.

The first image and the second image each include information of a target to be determined.

In the embodiments of the present disclosure, the first image and the second image have a spatiotemporal sequence relationship, and each includes information of a corresponding target to be determined. Based on a comprehensive consideration of the temporal information, the spatial information, and the image feature information of the images, persons skilled in the art may preliminarily determine a preliminary sameness probability value of the targets to be determined in the two images by any appropriate method.

In a feasible solution, a preliminary sameness probability value of the targets to be determined respectively contained in the first image and the second image may be obtained by using a Siamese-CNN.

A Siamese-CNN is a CNN having at least two branches, and may receive multiple inputs simultaneously and output the similarity between the multiple inputs (which can be expressed in the form of probability). Taking double branches as an example, two images can be simultaneously input to the Siamese-CNN by means of the double branches, and the Siamese-CNN will output the similarity between the two images, or output a determination result concerning whether the two images are similar. The Siamese-CNN in this embodiment includes three branches, where two branches are configured to receive input images, and the other branch is configured to receive the input difference in temporal information (temporal difference) and difference in spatial information (spatial difference) between the two images. By detecting the input images, the similarity in feature (such as appearance similarity) between target objects (which are vehicles in this embodiment) in the images is output, and by detecting the input difference in temporal information and difference in spatial information, the similarity in time and space between the target objects in the images is output. According to the similarity in the two aspects, the preliminary sameness probability value of the target objects in the images, such as the vehicles in this embodiment, may be further determined.

In view of the above, in this embodiment, the first image and the second image, and the difference in temporal information and the difference in spatial information between the first image and the second image may be input into a Siamese-CNN to obtain a preliminary sameness probability value of the targets to be determined in the first image and the second image. After the preliminary sameness probability value is obtained, it is preliminarily determined according to the preliminary sameness probability value that the first image and the second image include the same target to be determined. Specifically, the preliminary sameness probability value is compared with a preset value, if the preliminary sameness probability value is less than or equal to the preset value, it is determined that the first image and the second image do not include the same target to be determined, and if the preliminary sameness probability value is greater than the preset value, it is preliminarily determined that the first image and the second image include the same target to be determined. The preset value may be appropriately set by persons skilled in the art according to actual conditions, and is not limited in the embodiments of the present disclosure.

The Siamese-CNN can effectively determine the similarity between target objects, such as vehicles, in two images having spatiotemporal information, but the present disclosure is not limited to Siamese-CNN. Other ways or neural networks that have similar functions or that can achieve the same purpose are also applicable to the solutions in the embodiments of the present disclosure.

In step S304, a prediction path is generated based on the first image and the second image if the preliminary sameness probability value is greater than a preset value.

Compared with the pedestrian's travel route, the travel routes of the targets to be determined, such as vehicles, are more stable and more regular. Therefore, the travel routes of the vehicles may be predicted by using the feature information of the vehicles (which can characterize the appearances of the vehicles) together with the spatiotemporal information, and the reliability of vehicle re-identification can be enhanced by means of the route prediction results.

As stated above, the first image and the second image are images having a spatiotemporal sequence relationship. On this basis, it is necessary to further find possible travel routes of the vehicles in the images, where images of the vehicles captured on the travel routes should have a spatiotemporal sequence relationship with the first image and the second image.

In a specific implementation, the prediction path of the targets to be determined is generated by means of an MRF according to the information of the first image and the information of the second image. The specific implementation process is similar to that in step S204 in the foregoing Embodiment II, and details are not described herein again.

In step S306, validity determination is performed on the prediction path, and whether the targets to be determined in the first image and the second image are the same target to be determined is re-identified according to a determination result.

The validity determination is determination of a possibility whether a prediction path will be the travel route of the same target to be determined. The higher the possibility is, the higher the possibility of the targets to be determined in the first image and the second image being the same target to be determined is.

For example, in some cases, it is possible that the preliminary determination result itself is wrong, that is, the vehicle in the first image and the vehicle in the second image may not be the same vehicle but are misidentified as the same vehicle. If the two vehicles are not the same vehicle, the probability of the two vehicles having the same driving route within a possible reasonable time range is particularly low, causing that the validity of the prediction path determined according to the information of the first image and the information of the second image is also low. Thus, whether the vehicles in the first image and the second image is the same vehicle can be re-determined and re-identified.

In a specific implementation, validity determination is performed on the prediction path by means of an LSTM, and whether the targets to be determined in the first image and the second image are the same target to be determined is re-identified according to the determination result. The specific implementation process is similar to that in step S206 in the foregoing Embodiment II, and details are not described herein again.

According to the method for identifying a target provided by this embodiment, on the basis of preliminarily determining that the targets to be determined respectively contained in the first image and the second image are the same, a prediction path through which the targets to be determined may pass is determined; then, whether the preliminary determination result is correct is determined by means of validity determination of the prediction path, so as to re-identify whether the targets to be determined in the first image and the second image are the same target to be determined. The validity determination is determination of a possibility whether the current prediction path will be the travel route of the same target to be determined. The higher the possibility is, the higher the possibility of the targets to be determined in the first image and the second image being the same target to be determined is. Thus, whether targets to be determined in different images are the same target to be determined can be re-detected and re-identified more accurately.

The method for identifying a target in this embodiment is performed by any appropriate device having image or data processing capabilities, including but not limited to: a camera, a terminal, a mobile terminal, a PC, a server, an in-vehicle device, an entertainment device, an advertising device, a PDA, a tablet computer, a laptop computer, a handheld game console, smart glasses, a smart watch, a wearable device, a virtual display device, or a display enhancement device (such as Google Glass, Oculus Rift, Hololens, Gear VR), and the like.

Embodiment IV

Figure 4:
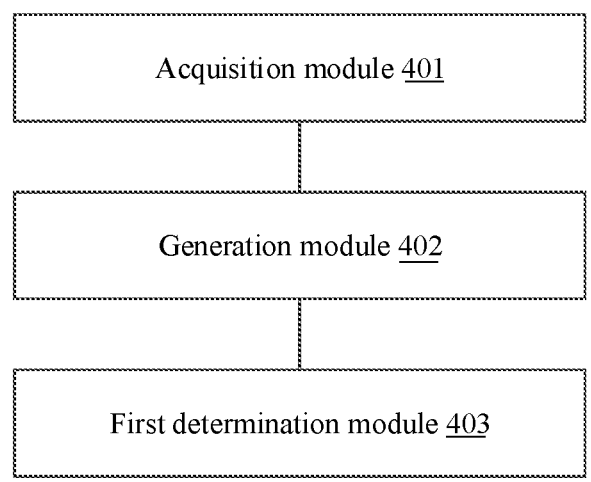
FIG. 4 is a structural block diagram of an apparatus for identifying a target according to Embodiment IV of the present disclosure.

FIG. 4 is a schematic structural diagram showing an apparatus for identifying a target according to Embodiment IV of the present disclosure, based on the same technical concept. The apparatus for identifying a target can be configured to execute the method for identifying a target according to Embodiment I.

Referring to FIG. 4, the apparatus for identifying a target includes an acquisition module 401, a generation module 402, and a first determination module 403.

The acquisition module 401 is configured to acquire a first image and a second image, the first image and the second image each including a target to be determined;

the generation module 402 is configured to generate a prediction path based on the first image and the second image, both ends of the prediction path respectively corresponding to the first image and the second image; and the first determination module 403 is configured to perform validity determination on the prediction path and determine, according to a determination result, whether the targets to be determined in the first image and the second image are the same target to be determined.

By means of the apparatus for identifying a target provided by this embodiment, a prediction path through which the targets to be determined may pass is generated based on information contained in the first image and the second image; and whether the targets to be determined in the first image and the second image are the same is determined by performing validity determination on the prediction path. The validity determination is determination of a possibility whether the current prediction path will be the travel route of the same target to be determined. The higher the possibility is, the higher the possibility of the targets to be determined in the first image and the second image being the same target to be determined is. Thus, whether targets to be determined in different images are the same target to be determined can be detected and identified more accurately.

Embodiment V

Figure 5:
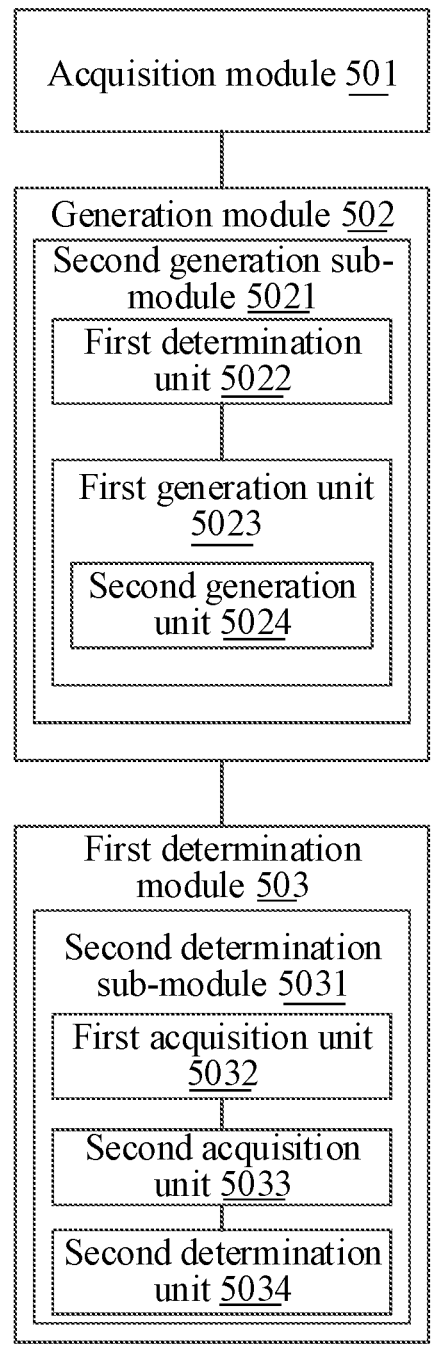
FIG. 5 is a structural block diagram of an apparatus for identifying a target according to Embodiment V of the present disclosure.

FIG. 5 is a schematic structural diagram showing an apparatus for identifying a target according to Embodiment V of the present disclosure, based on the same technical concept. The target identification apparatus can be configured to execute the method for identifying a target according to Embodiment II.

Referring to FIG. 5, the apparatus for identifying a target includes an acquisition module 501, a generation module 502, and a first determination module 503. The acquisition module 501 is configured to acquire a first image and a second image, the first image and the second image each including a target to be determined; the generation module 502 is configured to generate a prediction path based on the first image and the second image, both ends of the prediction path respectively corresponding to the first image and the second image; and the first determination module 503 is configured to perform validity determination on the prediction path and determine, according to a determination result, whether the targets to be determined in the first image and the second image are the same target to be determined.

In one embodiment, the generation module 502 includes: a second generation sub-module 5021 configured to generate the prediction path of the targets to be determined by means of a probability model according to the feature information of the first image, the temporal information of the first image, the spatial information of the first image, the feature information of the second image, the temporal information of the second image, and the spatial information of the second image.

In one embodiment, the second generation sub-module 5021 includes: a first determination unit 5022 configured to determine, by means of an MRF, all images including information of the targets to be determined and having a spatiotemporal sequence relationship with the first image and the second image from an acquired image set; and a first generation unit 5023 configured to generate, according to temporal information and spatial information corresponding to all the determined images, the prediction path of the targets to be determined.

In one embodiment, the first generation unit 5023 includes: a second generation unit 5024 configured to generate a prediction path with the first image as a head node and the second image as a tail node according to the temporal information and the spatial information corresponding to all the determined images, where the prediction path further corresponds to at least one intermediate node in addition to the head node and the tail node.

In one embodiment, the first determination unit 5022 is configured to: acquire position information of all camera devices from a start position to an end position by using a position corresponding to the spatial information of the first image as the start position and using a position corresponding to the spatial information of the second image as the end position; generate, according to the relationships between positions indicated by the position information of all the camera devices, at least one device path by using a camera device corresponding to the start position as a start point and using a camera device corresponding to the end position as an end point, where each device path further includes information of at least one other camera device in addition to the camera device as the start point and the camera device as the end point; and determine, from images captured by each of the other camera devices on the current path, an image for each device path by using time corresponding to the temporal information of the first image as start time and using time corresponding to the temporal information of the second image as end time, wherein the image includes the information of the targets to be determined, and has a set temporal sequence relationship with an image which includes the information of the targets to be determined and is captured by a previous camera device adjacent to the current camera device.

In one embodiment, the second generation unit 5024 is configured to: generate, according to the temporal sequence relationship of the determined images, a plurality of connected intermediate nodes having a spatiotemporal sequence relationship for each device path; generate, according to the head node, the tail node, and the intermediate nodes, an image path having a spatiotemporal sequence relationship and corresponding to the current device path; and determine, from the image path corresponding to each device path, a maximum probability image path with the first image as the head node and the second image as the tail node as the prediction path of the targets to be determined.

In one embodiment, the second generation unit 5024 is further configured to: acquire, for the image path corresponding to each device path, a probability of images of every two adjacent nodes in the image path having information of the same target to be determined; calculate, according to the probability of the images of every two adjacent nodes in the image path having the information of the same target to be determined, a probability of the image path being a prediction path of the target to be determined; and determine, according to the probability of each image path being a prediction path of the target to be determined, the maximum probability image path as the prediction path of the target to be determined.

In one embodiment, the first determination module 503 includes: a second determination sub-module 5031 configured to perform validity determination on the prediction path by means of a neural network and determine, according to the determination result, whether the targets to be determined in the first image and the second image are the same target to be determined.

In one embodiment, the second determination sub-module 5031 includes: a first acquisition unit 5032 configured to acquire the temporal difference between adjacent images in the prediction path according to temporal information of the adjacent images, acquire the spatial difference between the adjacent images according to spatial information of the adjacent images, and acquire the feature difference between the targets to be determined in the adjacent images according to feature information of the targets to be determined in the adjacent images; and a second acquisition unit 5033 configured to input the obtained temporal difference, spatial difference, and feature difference between the adjacent images in the prediction path into an LSTM to obtain an identification probability of the targets to be determined in the prediction path; and a second determination unit 5034 configured to determine, according to the identification probability of the targets to be determined in the prediction path, whether the targets to be determined in the first image and the second image are the same target to be determined.

In one embodiment, the first acquisition unit 5032 is configured to: separately acquire feature information of the targets to be determined in the adjacent images by means of the Siamese-CNN; and acquire the feature difference between the targets to be determined in the adjacent images according to the separately acquired feature information.

It should be noted that more specific details of the apparatus for identifying a target provided by the embodiments of the present disclosure have been described in detail in the method for identifying a target provided by the embodiments of the present disclosure, and the details are not described herein again.

Embodiment VI

Figure 6:
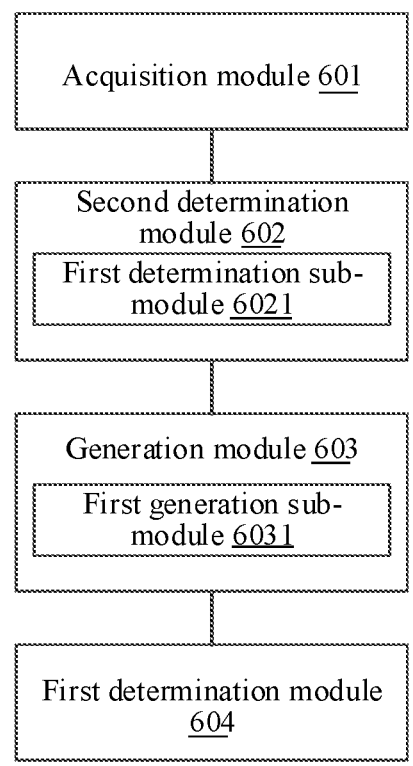
FIG. 6 is a structural block diagram of an apparatus for identifying a target according to Embodiment VI of the present disclosure.

FIG. 6 is a schematic structural diagram showing an apparatus for identifying a target according to Embodiment VI of the present disclosure, based on the same technical concept. The apparatus for identifying a target can be configured to execute the method for identifying a target according to Embodiment III.

Referring to FIG. 6, the apparatus for identifying a target includes an acquisition module 601, a generation module 603, and a first determination module 604. The acquisition module 601 is configured to acquire a first image and a second image, the first image and the second image each including a target to be determined; the generation module 603 is configured to generate a prediction path based on the first image and the second image, both ends of the prediction path respectively corresponding to the first image and the second image; and the first determination module 604 is configured to perform validity determination on the prediction path and determine, according to a determination result, whether the targets to be determined in the first image and the second image are the same.

In one embodiment, the target to be determined is a vehicle.

In one embodiment, the apparatus further includes: a second determination module 602 configured to determine, according to temporal information, spatial information, and image feature information of the first image and temporal information, spatial information, and image feature information of the second image, a preliminary sameness probability value of the targets to be determined respectively contained in the first image and the second image; and correspondingly, the generation module 603 includes: a first generation sub-module 6031 configured to generate a prediction path based on the first image and the second image if the preliminary sameness probability value is greater than a preset value.

In one embodiment, the second determination module 602 includes: a first determination sub-module 6021 configured to input the first image, the second image, and a difference in temporal information and a difference in spatial information between the first image and the second image into a Siamese-CNN to obtain a preliminary sameness probability value of the targets to be determined in the first image and the second image.

It should be noted that more specific details of the apparatus for identifying a target provided by the embodiments of the present disclosure have been described in detail in the method for identifying a target provided by the embodiments of the present disclosure, and the details are not described herein again.

Embodiment VII

Figure 7:
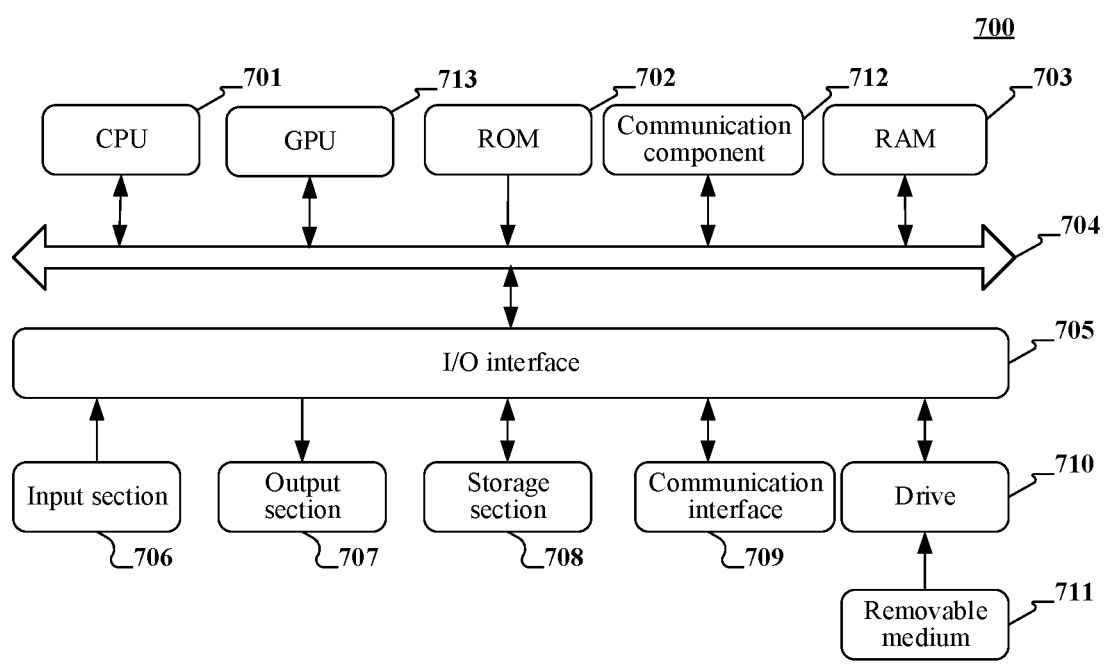
FIG. 7 is a schematic structural diagram of an electronic device according to Embodiment VII of the present disclosure.

Embodiment VII of the present disclosure provides an electronic device which, for example, may be a mobile terminal, a PC, a tablet computer, a server, and the like. Referring to FIG. 7 below, a schematic structural diagram of an electronic device 700, which may be a terminal device or a server, suitable for implementing the embodiments of the present disclosure is shown. As shown in FIG. 7, the electronic device 700 includes one or more processors, a communication element, and the like. The one or more processors are, for example, one or more Central Processing Units (CPUs) 701 and/or one or more Graphic Processing Units (GPUs) 713, and may execute appropriate actions and processing according to executable instructions stored in a Read-Only Memory (ROM) 702 or executable instructions loaded from a storage section 708 to a Random Access Memory (RAM) 703. The communication element includes a communication component 712 and/or a communication interface 709. The communication component 712 may include, but not limited to, a network card and the network card may include, but not limited to, an InfiniBand (IB) network card. The communication interface 709 includes a communication interface of a network interface card such as a LAN card and a modem, and the communication interface 709 performs communication processing via a network such as the Internet.

The processor may communicate with the ROM 702 and/or the RAM 703 to execute executable instructions, is connected to the communication component 712 by means of a bus 704, and communicates with other target devices by means of the communication component 712, so as to complete corresponding operations of any of the method for identifying a target provided by the embodiments of the present disclosure, for example, acquiring a first image and a second image, where the first image and the second image each include a target to be determined, generating a prediction path based on the first image and the second image, where both ends of the prediction path respectively correspond to the first image and the second image, and performing validity determination on the prediction path and determining, according to the determination result, whether the targets to be determined in the first image and the second image are the same.

In addition, the RAM 703 may further store various programs and data required for operations of the apparatuses. The CPU 701 or GPU 713, the ROM 702, and the RAM 703 are connected to each other by means of the communication bus 704. In the presence of the RAM 703, the ROM 702 is an optional module. The RAM 703 stores executable instructions, or writes the executable instructions to the ROM 702 during running. The executable instructions cause the processor to execute corresponding operations of the foregoing communication method. An Input/Output (I/O) interface 705 is also connected to the communication bus 704. The communication component 712 may be an integrated component, or may include multiple sub-modules (e.g., multiple IB network cards), and is linked with the communication bus.

The following components are connected to the I/O interface 705: an input section 706 including a keyboard, a mouse and the like; an output section 707 including a Cathode-Ray Tube (CRT), a Liquid Crystal Display (LCD), a loudspeaker and the like; the storage section 708 including hardware and the like; and the communication interface 709 of a network interface card such as a LAN card and a modem. A drive 710 is also connected to the I/O interface 705 according to needs. A removable medium 711 such as a magnetic disk, an optical disk, a magneto-optical disk, and a semiconductor memory is installed on the drive 710 according to needs, to cause a computer program read from the removable medium 711 to be installed into the storage section 708 according to needs.

It should be noted that the architecture illustrated in FIG. 7 is merely an optional implementation mode. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to an embodiment of the present disclosure may be implemented as a computer software program. For example, an embodiment of the present disclosure includes a computer program product, which includes a computer program tangibly contained in a machine-readable medium. The computer program includes a program code for executing a method shown in the flowchart. The program code may include corresponding instructions for correspondingly executing steps of the method provided by an embodiment of the present disclosure, for example, acquiring a first image and a second image, the first image and the second image each including a target to be determined, generating a prediction path based on the first image and the second image, both ends of the prediction path respectively corresponding to the first image and the second image, and performing validity determination on the prediction path and determining, according to a determination result, whether the targets to be determined in the first image and the second image are the same. In this embodiment, the computer program may be downloaded from a network by means of the communication element and installed, and/or be installed from the removable medium 711. When the computer program is executed by the processor, the functions defined in the method according to an embodiment of the present disclosure are executed.

It should be noted that according to needs for implementation, the components/steps described in the embodiments of the present disclosure may be split into more components/steps, and two or more components/steps or some operations of the components/steps may also be combined into new components/steps to achieve the purpose of the embodiments of the present disclosure.

The foregoing methods according to the embodiments of the present disclosure may be implemented in hardware or firmware, or implemented as software or computer codes stored in a recording medium (such as a CD ROM, RAM, floppy disk, hard disk, or magneto-optical disk), or implemented as computer codes that can be downloaded by means of a network and are originally stored in a remote recording medium or a non-volatile machine-readable medium and will be stored in a local recording medium; accordingly, the methods described herein may be handled by software stored in a medium using a general-purpose computer, a special-purpose processor, or programmable or dedicated hardware (such as ASIC or FPGA). As can be understood, a computer, a processor, a microprocessor controller or programmable hardware includes a storage component (e.g., RAM, ROM, flash memory, etc.) that can store or receive software or computer codes, when the software or computer codes are accessed and executed by the computer, processor or hardware, the processing method described herein is carried out. In addition, when a general-purpose computer accesses codes that implements the processes shown herein, the execution of the codes will convert the general-purpose computer to a special-purpose computer for executing the processes shown herein.

Persons of ordinary skill in the art can understand that the individual exemplary units and arithmetic steps that are described in conjunction with the embodiments disclosed herein are able to be implemented in electronic hardware, or a combination of computer software and electronic hardware. Whether these functions are implemented in hardware or software is determined by the specific applications and design constraint conditions of the technical solution. For each specific application, the described functions can be implemented by persons skilled in the art using different methods, but this implementation should not be considered to go beyond the scope of the embodiments of the present disclosure.

The above implementations are merely intended to describe the embodiments of the present disclosure, and are not intended to limit the embodiments of the present disclosure. Persons of ordinary skill in the art may make various variations and modifications without departing from the spirit and scope of the embodiments of the present disclosure. Therefore, all equivalent technical solutions also fall within the scope of the embodiments of the present disclosure, and the patent protection scope of the embodiments of the present disclosure shall be limited by the claims.

The invention claimed is:

1. A method for identifying a target, comprising:
acquiring a first image and a second image, the first image and the second image each comprising a target to be determined;
generating a prediction path based on the first image and the second image, both ends of the prediction path respectively corresponding to targets to be determined in the first image and the second image; and
performing validity determination on the prediction path, and determining, according to a determination result, whether the targets to be determined in the first image and the second image are the same target to be determined,
wherein the generating the prediction path based on the first image and the second image comprises:

generating, through a probability model, the prediction path of the targets to be determined according to feature information, temporal information and spatial information of the first image, and feature information, temporal information and spatial information of the second image.

2. The method according to claim 1, wherein before generating the prediction path based on the first image and the second image, the method further comprises:
determining a preliminary sameness probability value of the targets to be determined respectively contained in the first image and the second image according to the temporal information, the spatial information, and the image feature information of the first image and the temporal information, the spatial information, and the image feature information of the second image;
wherein generating the prediction path based on the first image and the second image comprises:
generating the prediction path based on the first image and the second image if the preliminary sameness probability value is greater than a preset value.

3. The method according to claim 2, wherein determining the preliminary sameness probability value of the targets to be determined respectively contained in the first image and the second image according to the temporal information, the spatial information, and the image feature information of the first image and the temporal information, the spatial information, and the image feature information of the second image comprises:
inputting the first image, the second image, and a difference in temporal information and a difference in spatial information between the first image and the second image into a Siamese Convolutional Neural Network (Siamese-CNN) to obtain the preliminary sameness probability value of the targets to be determined in the first image and the second image.

4. The method according to claim 1, wherein generating, through the probability model, the prediction path of the targets to be determined comprises:
determining, through a chain Markov Random Field (MRF) model, all images comprising information of the targets to be determined and having a spatiotemporal sequence relationship with the first image and the second image from an acquired image set; and
generating, according to temporal information and spatial information corresponding to all the determined images, the prediction path of the targets to be determined;
wherein generating, according to the temporal information and the spatial information corresponding to all the determined images, the prediction path of the targets to be determined comprises:
generating a prediction path with the first image as a head node and the second image as a tail node according to the temporal information and the spatial information corresponding to all the determined images, wherein the prediction path further corresponds to at least one intermediate node in addition to the head node and the tail node.

5. The method according to claim 4, wherein determining, through the chain MRF model, all images comprising the information of the targets to be determined and having the spatiotemporal sequence relationship with the first image and the second image from the acquired image set comprises:
acquiring position information of all camera devices from a start position to an end position by using a position corresponding to the spatial information of the first image as the start position and using a position corresponding to the spatial information of the second image as the end position;
generating, according to the relationships between positions indicated by the position information of all the camera devices, at least one device path by using a camera device corresponding to the start position as a start point and using a camera device corresponding to the end position as an end point, wherein each device path further comprises information of at least one other camera device in addition to the camera device as the start point and the camera device as the end point; and
determining, from images captured by each of the other camera devices on the current path, an image for each device path by using time corresponding to the temporal information of the first image as start time and using time corresponding to the temporal information of the second image as end time, wherein the image comprises the information of the targets to be determined, and has a set temporal sequence relationship with an image which comprises the information of the targets to be determined and is captured by a previous camera device adjacent to the current camera device.

6. The method according to claim 5, wherein generating the prediction path with the first image as the head node and the second image as the tail node according to the temporal information and the spatial information corresponding to all the determined images comprises:
generating, according to the temporal sequence relationship of the determined images, a plurality of connected intermediate nodes having a spatiotemporal sequence relationship for each device path, and generating, according to the head node, the tail node, and the intermediate nodes, an image path having a spatiotemporal sequence relationship and corresponding to the current device path; and
determining, from the image path corresponding to each device path, a maximum probability image path with the first image as the head node and the second image as the tail node as the prediction path of the targets to be determined.

7. The method according to claim 6, wherein determining, from the image path corresponding to each device path, the maximum probability image path with the first image as the head node and the second image as the tail node as the prediction path of the targets to be determined comprises:
acquiring, for the image path corresponding to each device path, a probability of images of every two adjacent nodes in the image path having information of the same target to be determined;
calculating, according to the probability of the images of every two adjacent nodes in the image path having the information of the same target to be determined, a probability of the image path being a prediction path of the target to be determined; and
determining, according to the probability of each image path being a prediction path of the target to be determined, the maximum probability image path as the prediction path of the target to be determined.

8. The method according to claim 1, wherein performing the validity determination on the prediction path and determining, according to the determination result, whether the targets to be determined in the first image and the second image are the same target to be determined comprises:
performing, through a neural network, validity determination on the prediction path and determining, according to the determination result, whether the targets to be determined in the first image and the second image are the same target to be determined;

wherein performing, through the neural network, the validity determination on the prediction path and determining whether the targets to be determined in the first image and the second image are the same target to be determined according to the determination result comprises:

acquiring a temporal difference between adjacent images in the prediction path according to temporal information of the adjacent images; acquiring a spatial difference between the adjacent images according to spatial information of the adjacent images; and acquiring a feature difference between the targets to be determined in the adjacent images according to feature information of the targets to be determined in the adjacent images;

inputting the obtained temporal difference, spatial difference, and feature difference between the adjacent images in the prediction path into a Long Short-Term Memory (LSTM) network to obtain an identification probability of the targets to be determined in the prediction path; and determining, according to the identification probability of the targets to be determined in the prediction path, whether the targets to be determined in the first image and the second image are the same target to be determined.

9. The method according to claim 8, wherein acquiring the feature difference between the targets to be determined in the adjacent images according to the feature information of the targets to be determined in the adjacent images comprises:

separately acquiring feature information of the targets to be determined in the adjacent images through the Siamese-CNN; and acquiring the feature difference between the targets to be determined in the adjacent images according to the separately acquired feature information.

10. An apparatus for identifying a target, comprising:
a processor; and
a memory for storing instructions executable by the processor;
wherein the processor is configured to:
acquire a first image and a second image, the first image and the second image each comprising a target to be determined;
generate a prediction path based on the first image and the second image, both ends of the prediction path respectively corresponding to targets to be determined in the first image and the second image; and
perform validity determination on the prediction path and determine, according to a determination result, whether the targets to be determined in the first image and the second image are the same target to be determined,
wherein the processor is further configured to:
generate, through a probability model, the prediction path of the targets to be determined according to feature information, temporal information and spatial information of the first image, and feature information, temporal information and spatial information of the second image.

11. The apparatus according to claim 10, wherein the processor is configured to:
determine, according to the temporal information, the spatial information, and the image feature information of the first image and the temporal information, the spatial information, and the image feature information of the second image, a preliminary sameness probability value of the targets to be determined respectively contained in the first image and the second image;

wherein the operation of generating the prediction path based on the first image and the second image comprises:
generating the prediction path based on the first image and the second image if the preliminary sameness probability value is greater than a preset value.

12. The apparatus according to claim 11, wherein the processor is configured to:
input the first image, the second image, and a difference in temporal information and a difference in spatial information between the first image and the second image into a Siamese Convolutional Neural Network (Siamese-CNN) to obtain a preliminary sameness probability value of the targets to be determined in the first image and the second image.

13. The apparatus according to claim 10, wherein the processor is configured to:
determine, through a chain Markov Random Field (MRF) model, all images comprising information of the targets to be determined and having a spatiotemporal sequence relationship with the first image and the second image from an acquired image set; and
generate, according to temporal information and spatial information corresponding to all the determined images, the prediction path of the targets to be determined;

wherein the operation of generating, according to the temporal information and the spatial information corresponding to all the determined images, the prediction path of the targets to be determined comprises:
generating a prediction path with the first image as a head node and the second image as a tail node according to the temporal information and the spatial information corresponding to all the determined images, wherein the prediction path further corresponds to at least one intermediate node in addition to the head node and the tail node.

14. The apparatus according to claim 13, wherein the processor is further configured to:
acquire position information of all camera devices from a start position to an end position by using a position corresponding to the spatial information of the first image as the start position and using a position corresponding to the spatial information of the second image as the end position;
generate, according to the relationships between positions indicated by the position information of all the camera devices, at least one device path by using a camera device corresponding to the start position as a start point and using a camera device corresponding to the end position as an end point, wherein each device path further comprises information of at least one other camera device in addition to the camera device as the start point and the camera device as the end point; and
determine, from images captured by each of the other camera devices on the current path, an image for each device path by using time corresponding to the temporal information of the first image as start time and using time corresponding to the temporal information of the second image as end time, wherein the image comprises the information of the targets to be determined, and has a set temporal sequence relationship with an image which comprises the information of the targets to be determined and is captured by a previous camera device adjacent to the current camera device.

15. The apparatus according to claim 14, wherein the processor is configured to:

generate, according to the temporal sequence relationship of the determined images, a plurality of connected intermediate nodes having a spatiotemporal sequence relationship for each device path; and generate, according to the head node, the tail node, and the intermediate nodes, an image path having a spatiotemporal sequence relationship and corresponding to the current device path; and determine, from the image path corresponding to each device path, a maximum probability image path with the first image as the head node and the second image as the tail node as the prediction path of the targets to be determined.

16. The apparatus according to claim 15, wherein the processor is further configured to:

acquire, for the image path corresponding to each device path, a probability of images of every two adjacent nodes in the image path having information of the same target to be determined;

calculate, according to the probability of the images of every two adjacent nodes in the image path having the information of the same target to be determined, a probability of the image path being a prediction path of the target to be determined; and determine, according to the probability of each image path being a prediction path of the target to be determined, the maximum probability image path as the prediction path of the target to be determined.

17. The apparatus according to claim 10, wherein the processor is configured to:

perform validity determination on the prediction path through a neural network and determine, according to a determination result, whether the targets to be determined in the first image and the second image are the same target to be determined;

wherein the operation of performing the validity determination on the prediction path through the neural network and determine, according to the determination result, whether the targets to be determined in the first image and the second image are the same target to be determined comprises:

acquiring a temporal difference between adjacent images in the prediction path according to temporal information of the adjacent images; acquire a spatial difference between the adjacent images according to spatial information of the adjacent images; and acquire a feature difference between the targets to be determined in the adjacent images according to feature information of the targets to be determined in the adjacent images;

inputting the obtained temporal difference, spatial difference, and feature difference between the adjacent images in the prediction path into a Long Short-Term Memory (LSTM) network to obtain an identification probability of the targets to be determined in the prediction path; and determining, according to the identification probability of the targets to be determined in the prediction path, whether the targets to be determined in the first image and the second image are the same target to be determined, wherein the operation of acquiring the feature difference between the targets to be determined in the adjacent images according to the feature information of the targets to be determined in the adjacent images comprises:

separately acquiring feature information of the targets to be determined in the adjacent images through the Siamese-CNN; and acquiring the feature difference between the targets to be determined in the adjacent images according to the separately acquired feature information.

18. A non-transitory computer-readable storage medium, having computer program instructions stored thereon, wherein the program instructions, when being executed by a processor, are configured to perform the operations of:

acquiring a first image and a second image, the first image and the second image each comprising a target to be determined;

generating a prediction path based on the first image and the second image, both ends of the prediction path respectively corresponding to targets to be determined in the first image and the second image; and performing validity determination on the prediction path, and determining, according to a determination result, whether the targets to be determined in the first image and the second image are the same target to be determined, wherein the generating the prediction path based on the first image and the second image comprises:

generating, through a probability model, the prediction path of the targets to be determined according to feature information, temporal information and spatial information of the first image, and feature information, temporal information and spatial information of the second image.

19. The non-transitory computer-readable storage medium of claim 18, wherein before generating the prediction path based on the first image and the second image, the operations further comprise:

determining a preliminary sameness probability value of the targets to be determined respectively contained in the first image and the second image according to the temporal information, the spatial information, and the image feature information of the first image and the temporal information, the spatial information, and the image feature information of the second image;

wherein generating the prediction path based on the first image and the second image comprises:

generating the prediction path based on the first image and the second image if the preliminary sameness probability value is greater than a preset value.

20. The non-transitory computer-readable storage medium of claim 19, wherein the operation of determining the preliminary sameness probability value of the targets to be determined respectively contained in the first image and the second image according to the temporal information, the spatial information, and the image feature information of the first image and the temporal information, the spatial information, and the image feature information of the second image comprises:

inputting the first image, the second image, and a difference in temporal information and a difference in spatial information between the first image and the second image into a Siamese Convolutional Neural Network (Siamese-CNN) to obtain the preliminary sameness probability value of the targets to be determined in the first image and the second image.

* * * * *